(12) United States Patent
Moon et al.

(10) Patent No.: US 9,879,950 B2
(45) Date of Patent: Jan. 30, 2018

(54) INFLATOR MOUNTED ON PROTECTIVE EQUIPMENT

(71) Applicant: Secure Medic Co., Ltd., Seongnam-si (KR)

(72) Inventors: Man Ho Moon, Gunsan-si (KR); Osang Kwon, Seoul (KR)

(73) Assignee: Secure Medic Co., Ltd., Seongnam-si (KR)

( * ) Notice: Subject to any disclaimer, the term of this patent is extended or adjusted under 35 U.S.C. 154(b) by 0 days.

(21) Appl. No.: 15/507,247

(22) PCT Filed: Aug. 27, 2015

(86) PCT No.: PCT/KR2015/008967
§ 371 (c)(1),
(2) Date: Feb. 28, 2017

(87) PCT Pub. No.: WO2016/036052
PCT Pub. Date: Mar. 10, 2016

(65) Prior Publication Data
US 2017/0307342 A1    Oct. 26, 2017

(30) Foreign Application Priority Data
Sep. 1, 2014    (KR) .......................... 10-2014-0115560

(51) Int. Cl.
*F42B 3/04*        (2006.01)
*A41D 13/018*      (2006.01)
(Continued)

(52) U.S. Cl.
CPC ............ *F42B 3/045* (2013.01); *A41D 13/018* (2013.01); *B60R 21/18* (2013.01);
(Continued)

(58) Field of Classification Search
CPC ...... F42B 3/045; F42B 39/02; B60R 21/2171; B60R 21/23; B60R 21/18; B60R 2021/165; A41D 13/018
See application file for complete search history.

(56) References Cited

U.S. PATENT DOCUMENTS 2,840,327 A * 6/1958 Stanley ................... B60R 22/30
24/598.1
3,547,165 A * 12/1970 Butterworth .............. B63C 9/24
141/330
(Continued)

FOREIGN PATENT DOCUMENTS

CN         2483265       3/2002
JP         3068775       2/2000
(Continued)

OTHER PUBLICATIONS

International Search Report dated Nov. 24, 2015 From the Korean Intellectual Property Office Re. Application No. PCT/KR2015/008967 and Its Translation Into English. (4 Pages).

*Primary Examiner* — Darlene P Condra

(57) ABSTRACT

The present invention relates to an inflator mounted on protective equipment, comprising: a main body (100) having a cylindrical structure that is open at the top and bottom thereof, wherein the main body (100) has a key-ball insertion hole (110) and a gas supply hole (120) that are formed on portions of a lateral side thereof, and a bomb (600) for storing compressed air is coupled to the lower side of the main body (100); an eccentric lever (200) that is rotatably coupled to the upper opening of the main body (100) through a rotation shaft (230) and includes a lever (210) that adjusts a downward pressure by rotating an eccentric drum part (220) having the shape of a circular plate; a perforation part (300) that provides a restoring force downward according to the pressure state of the eccentric lever (200) and perforates (Continued)

the bomb (600) to allow the gas in the bomb (600) to be supplied to a user's protective equipment through the gas supply hole (120); and a key-ball (400) that confines the movement of the perforation part (300) while being inserted into the key-ball insertion hole (110) and separates from the key-ball insertion hole (110) according to the state of the outside to operate the perforation part (300).

4 Claims, 3 Drawing Sheets

(51) Int. Cl.
 *F42B 39/02* (2006.01)
 *B60R 21/18* (2006.01)
 *B60R 21/23* (2006.01)
 *B60R 21/217* (2011.01)
 *B60R 21/16* (2006.01)
(52) U.S. Cl.
 CPC ......... *B60R 21/2171* (2013.01); *B60R 21/23* (2013.01); *F42B 39/02* (2013.01); *B60R 2021/165* (2013.01)

(56) References Cited

U.S. PATENT DOCUMENTS

| | | | | |
|---|---|---|---|---|
| 4,161,797 | A | * | 7/1979 | Ruscigno .................. B63C 9/24 137/543.17 |
| 4,894,036 | A | | 1/1990 | Switlik |
| 6,123,227 | A | * | 9/2000 | Umeda ..................... B63C 9/24 222/5 |
| 6,422,420 | B1 | * | 7/2002 | Brown ...................... B63C 9/24 116/277 |
| 7,011,232 | B2 | * | 3/2006 | Colombo .............. B60R 21/268 222/5 |
| 7,475,711 | B2 | | 1/2009 | Fawcett, Jr. et al. |
| 2007/0118952 | A1 | * | 5/2007 | Lee ...................... A41D 13/018 2/69 |

FOREIGN PATENT DOCUMENTS

| | | |
|---|---|---|
| JP | 2000-126320 | 5/2000 |
| KR | 10-2002-0012667 | 2/2002 |
| KR | 10-1066963 | 9/2011 |
| KR | 10-2013-0107144 | 10/2013 |
| KR | 10-2013-0126246 | 11/2013 |

* cited by examiner

INFLATOR MOUNTED ON PROTECTIVE EQUIPMENT

RELATED APPLICATIONS

This application is a National Phase of PCT Patent Application No. PCT/KR2015/008967 having International filing date of Aug. 27, 2015, which claims the benefit of priority of Korean Patent Application No. 10-2014-0115560 filed on Sep. 1, 2014. The contents of the above applications are all incorporated by reference as if fully set forth herein in their entirety.

FIELD AND BACKGROUND OF THE INVENTION

The present invention relates to an inflator mounted on protective equipment, and more particularly to an inflator mounted on protective equipment that generates neither noise nor heat.

Recently, the domestic and international leisure sports population has been increasing at a very rapid pace and, accordingly, injury or fatal accident rates are increasing. As leisure sports become more diverse, an increasing number of people travel by means of transportation, e.g., bicycles, motorcycles, and the like, and an increasing number of people ride horses. In addition, the number of people enjoying various kinds of leisure activities such as relatively risky climbing, paragliding, and the like is on the rise, resulting in growing concerns of injury during leisure sports activities.

To protect drivers of two-wheeled vehicles or the like or people engaged in leisure sports activities such as horse riding and the like, personal protective equipment has been developed. Such personal protective equipment has been developed for the purpose of preventing or reducing damage to the human body by inflating the protective equipment such as an airbag in dangerous situations, and is configured such that a gas container is perforated using explosive power of gunpowder, and gas of the gas container is supplied to the personal protective equipment.

However, unlike airbags of four-wheeled vehicles, a conventional inflator must be mounted together with protective equipment that people wear directly, which may cause secondary damage due to heat and noise.

To address the above-described problem, the applicant of the present invention has proposed an inflator mounted on protective equipment disclosed in Korean Patent Application Registration No. 10-1066963. This application discloses an inflator mounted on protective equipment to minimize generation of noise and heat.

However, such gunpowder-driven inflators inevitably generate heat and noise, and must be discarded due to not being reusable and therefore are cost-consuming.

In addition, such inflators are relatively heavy and thus are not suitable for use in protective equipment for leisure sports requiring intense physical activity.

SUMMARY OF THE INVENTION

Therefore, the present invention has been made in view of the above problems, and it is one object of the present invention to provide an inflator mounted on protective equipment which can perform an exploding operation without using gunpowder and thus prevents generation of heat and noise.

It is another object of the present invention to provide a reusable inflator mounted on protective equipment.

In accordance with one aspect of the present invention, provided is an inflator mounted on protective equipment, including: a main body 100 having a cylindrical structure with upper and lower openings, provided with a key ball insertion hole 110 and a gas supply hole 120 in lateral portions thereof, and provided, at a lower side thereof, with a bomb 600 coupled thereto to store a compressed air; an eccentric lever 200 rotatably coupled to the upper opening of the main body 100 by a rotary shaft 230 and including a lever 210 to adjust downward pressure by rotating an eccentric drum part 220 having a circular plate shape; a perforating part 300 to provide a restoring force downward according to a pressure state of the eccentric lever 200 and to perforate the bomb 600 so as to supply a gas of the bomb 600 to protective equipment of a user via the gas supply hole 120; and a key ball 400 to restrict movement of the perforating part 300 while being inserted into the key ball insertion hole 110 and escape therefrom according to an external state to operate the perforating part 300.

As is apparent from the fore-going description, the present invention advantageously provides an inflator mounted on protective equipment which may prevent generation of noise and heat by using a key ball with a wire connected thereto instead of using gunpowder, thus preventing secondary damage, and does not require additional elements for decreasing noise and heat and thus may have decreased volume and weight.

In addition, the inflator mounted on protective equipment is reusable and thus may have a cost-saving effect.

Moreover, the inflator mounted on protective equipment does not require a separate component or tool even when a key ball is recoupled for reuse, using an eccentric lever and thus may have an effect of improving convenience of use.

<Description of reference numerals>

| 100: | MAIN BODY | 110: | KEY BALL INSERTION HOLE |
|---|---|---|---|
| 120: | GAS SUPPLY HOLE | 130: | CUTAWAY PORTION |
| 200: | ECCENTRIC LEVER | 210: | LEVER |
| 220: | DRUM PART | 230: | ROTARY SHAFT |
| 300: | PERFORATING PART | 310: | PRESSING MEMBER |
| 320: | SPRING | 330: | PERFORATING BODY PART |
| 331: | CONNECTION HOLE | 340: | PERFORATING PIN |
| 400: | KEY BALL | 410: | WIRE |
| 500: | INSTALLATION PART | 600: | BOMB |

DESCRIPTION OF SPECIFIC EMBODIMENTS OF THE INVENTION

Hereinafter, an inflator mounted on protective equipment of the present invention will be described in detail with reference to the accompanying drawings.

Figure 1:
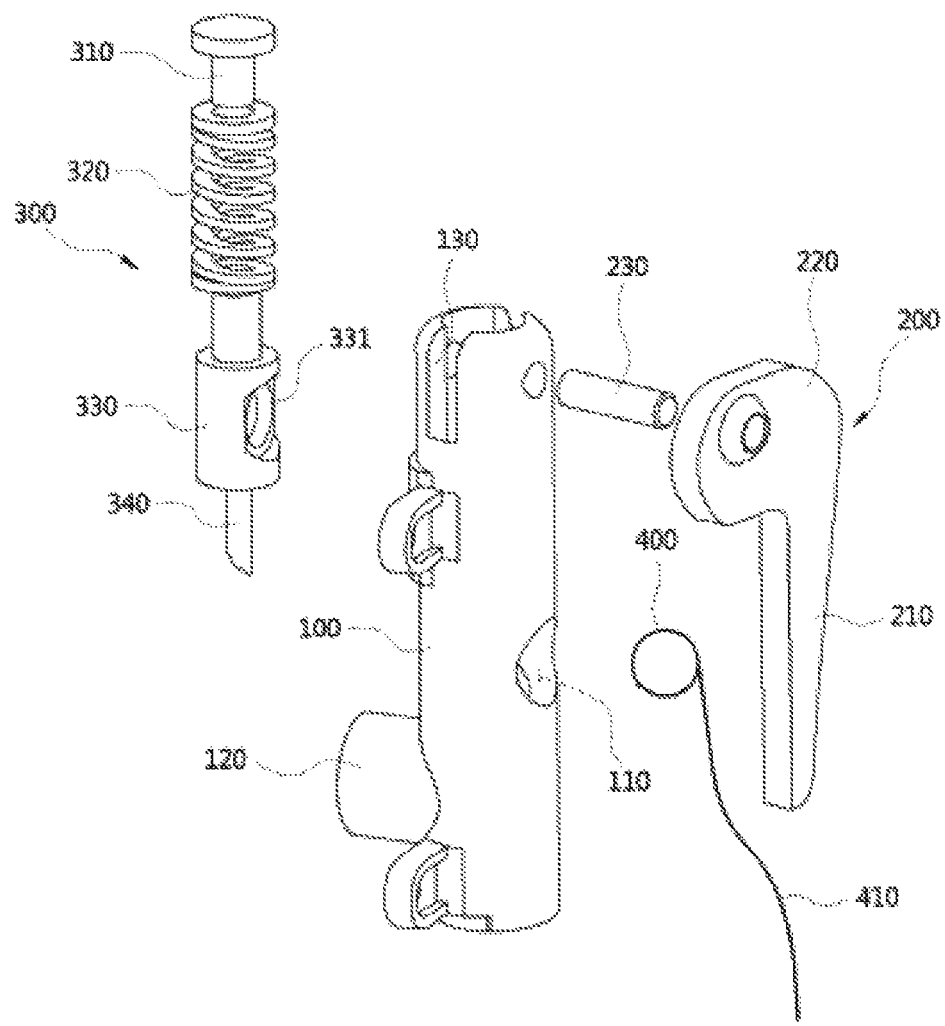
FIG. 1 is an exploded perspective view of an inflator mounted on protective equipment, according to an exemplary embodiment of the present invention.
Figure 2:
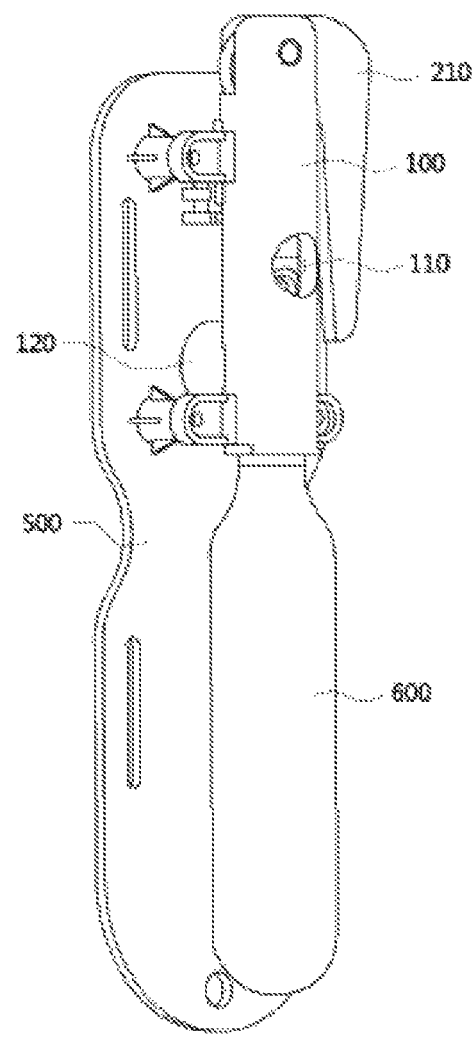
FIG. 2 is a perspective view illustrating a coupled state of a cartridge.
Figure 3:
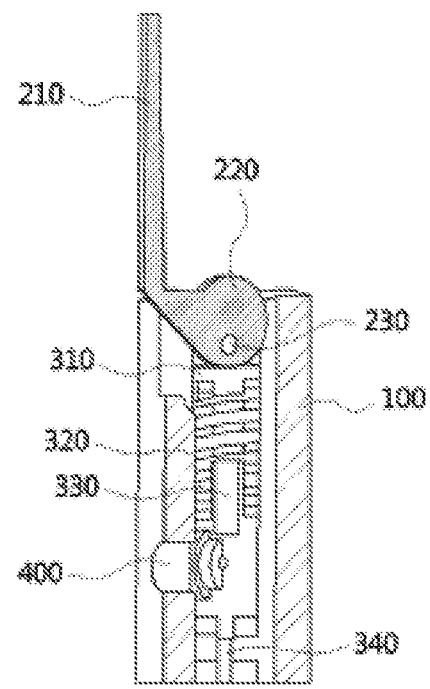
FIGS. 3 and 4 are cross-sectional views for explaining a mounting process according to the present invention.
Figure 4:
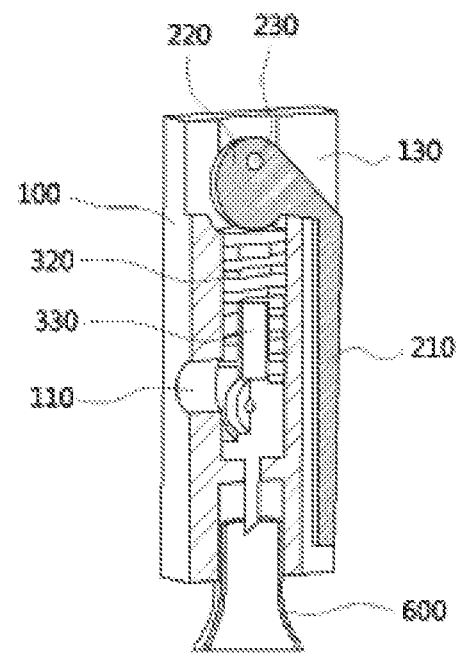

FIG. 1 is an exploded perspective view of an inflator mounted on protective equipment, according to an exemplary embodiment of the present invention. FIG. 2 is a perspective view illustrating a coupled state of a cartridge. FIGS. 3 and 4 are cross-sectional views for explaining a mounting process according to the present invention.

Referring to FIGS. 1 to 4, the inflator mounted on protective equipment, according to an exemplary embodiment of the present invention includes: a main body 100 having a cylindrical structure with upper and lower openings and provided with a key ball insertion hole 110 and a gas supply hole 120 formed in lateral portions thereof; an eccentric lever 200 rotatably coupled to the upper opening of the main body 100 by a rotary shaft 230 and including a lever 210 to adjust downward pressure by rotating an eccentric drum part 220 having a circular plate shape; a perforating part 300 to provide a restoring force downward according to a pressure state of the eccentric lever 200 and to perforate a bomb 600 so as to supply a gas of the bomb 600 to protective equipment of a user via the gas supply hole 120; and a key ball 400 to restrict movement of the perforating part 300 while being inserted into the key ball insertion hole 110 and escape therefrom according to an external state to operate the perforating part 300.

Hereinafter, configurations and functions of the inflator mounted on protective equipment, having the above-described structure will be described in further detail.

First, the main body 100 has a vertically long cylindrical structure with upper and lower openings. The main body 100 is provided, at left and right sides of the upper opening thereof, with a cutaway portion 130 where lateral portions of the main body 100 are cut. The cutaway portion 130 provides a space for rotation of the eccentric lever 200 as described above.

The bomb 600 is coupled to a lower portion of the main body 100 to store a compressed gas, and an installation part 500 is arranged on a side of the gas supply hole 120 of the main body 100 to fix protective equipment and the inflator of the present invention.

A hole, through which the rotary shaft 210 is inserted, is arranged in a direction perpendicular to a direction in which the cutaway portion 130 of the main body 100 is formed, and the rotary shaft 230 is rotatably fixed in the hole by passing through the eccentric drum part 220.

The drum part 220 has a circular plate shape and is provided, at one side thereof, with the lever 210 to rotate the drum part 220 about the rotary shaft 230 by user manipulation. The drum part 220 is rotatable by about 180 degrees by the cutaway portion 130.

The rotary shaft 230 is not inserted into the center of the drum part 220, but is positioned at an eccentric position thereof, and thus, while the drum part 220 rotates, a distance between an end of inner side of the main body 100 and the rotary shaft 230 is varied.

Referring to the drawings, when the lever 210 stands upright parallel to an upper side of the main body 100, the drum part 220 positioned on an inner side of the main body 100 has the smallest distance from the rotary shaft 230, and on the other hand, when the lever 210 is positioned laterally parallel to the main body 100, an end of the drum part 220 has the largest distance from the rotary shaft 230 on the inner side of the main body 100.

Thus, an inner space of the main body 100 is physically compressed or uncompressed by user manipulation of the eccentric lever 200. When the eccentric lever 200 is rotated in an uncompressed direction, a user may insert the key ball 400 with a wire 410 connected thereto through the key ball insertion hole 110.

The key ball 400 blocks operation of the perforating part 300 so as to maintain a compressed state of the perforating part 300. When the wire 410 is pulled by a predetermined force or greater, escapes from the key ball insertion hole 110 so that the compressed perforating part 300 moves downward to thereby strike the bomb 600.

The perforating part 300 includes: a spring 320 having a restoring force; a pressing member 310 positioned at an upper side of the spring 320 to receive a change in pressure according to rotation of the drum part 220 of the eccentric lever 200; a perforating body part 330 coupled to a lower side of the spring 320 to move downward by the restoring force of the spring 320 when the key ball 400 escapes from the key ball insertion hole 110; and a perforating pin 340 disposed below the perforating body part 330 to perforate the bomb 600. The perforating body part 330 is provided with a connection hole 331 through which a gas in the perforated bomb 600 is supplied to the gas supply hole 120 of the main body 100 via the perforating pin 340 having a hollow structure.

That is, when the bomb 600 is perforated by the perforating pin 340, the compressed gas inside the bomb 600 is discharged via the perforating pin 340, and the discharged gas is introduced into the perforating body part 330, supplied to the inside of the main body 100 via the connection hole 330, and then supplied, via the gas supply hole 120 disposed in a side surface of the main body 100, to protective equipment that a user wears.

The operation of the perforating part 300 will now be described in more detail. The perforating part 300 has a structure in which the pressing member 310, the spring 320, the perforating body part 330, and the perforating pin 340 are coupled to one another in this order from an upper side. In this case, the perforating body part 330 and the perforating pin 340 may be installed in an integrated form.

When the lever 210 has a form that vertically extends upward from the upper portion of the main body 100, i.e., when a pressure of the eccentric lever 200, acting on the pressing member 310, is weak, there is no pressure acting downward on the pressing member 310 and a user inserts the key ball 400 into the key ball insertion hole 100.

The key ball 400 is stuck in a step portion between a lower side of the perforating body part 330 and the perforating pin 340. The perforating body part 330 has a larger diameter than that of the perforating pin 340 and thus the step portion described above is formed.

As such, in a state of the key ball 400 being inserted into the perforating body part 330, the drum part 220 is rotated by user manipulation of the lever 210, thereby applying downward pressure to the pressing member 310 of the perforating part 300. The perforating body part 330 and the perforating pin 340 must move downward due to the downward pressure, but the movement of the perforating body part 330 is restricted by the key ball 400 and, therefore, the spring 320 is in a compressed state.

When a predetermined force acts on the wire 410 externally connected to the key ball 400 in the compressed state of the spring 320, the key ball 400 escapes from the key ball insertion hole 110. The expression "the wire 410 is pulled" as used herein indicates that an end of the wire 410 is fixed to another position, not protective equipment, and thus a user wearing protective equipment deviates from the original position, which may be regarded as accident occurrence.

As such, when the wire 410 is pulled due to occurrence of an accident, the key ball 400 escapes from the key ball insertion hole 110, the compressed spring 320 is uncompressed by the escape of the key ball 400, and, accordingly, the perforating body part 330 and the perforating pin 340 therebelow move downward so that the perforating pint 340 perforates the bomb 600.

As described above, the inflator according to the present invention percusses using the spring 320 and the key ball 400 instead of using gunpowder, and thus less noise and no heat is generated in the percussion thereof and, therefore, secondary damage to a user due to noise and heat may be prevented.

In addition, the inflator does not require structures for emitting heat and suppressing noise and thus has a simple structure and relatively small volume and weight, which makes it very suitable for use in protective equipment for leisure sports requiring a lot of activities.

As such, when the perforating pin 340 perforates the bomb 600 due to the escape of the key ball 400, a compressed gas stored in the bomb 600 is introduced into the perforating body part 330 via an inside of the perforating pin 340 and then is discharged to the inside of the main body 100 via the connection hole 331.

The gas discharged to the inside of the main body 100 is supplied to the protective equipment via the gas supply part 120. In this case, the perforating body part 330 has an inner diameter that is identical to or slightly smaller than that of the main body 100 so as to prevent the gas discharged to the inside of the main body 100 from leaking via the key ball insertion hole 110.

For smooth operation of the perforating body part 330, the main body 100 may be provided with a guide groove at an inside thereof, and the perforating body part 330 may be provided with a guide protrusion to be inserted into the guide groove.

As such, in the inflator according to the present invention used in occurrence of an accident, a new bomb 600 is installed, and a pressure acting inward on the main body 100 is relieved. The key ball 400 may be inserted again into the key ball insertion hole 110 by such manipulation of the eccentric lever 200 and, accordingly, the inflator may be reusable.

As such, the key ball 400 may be easily inserted only by manipulation of the lever 210, and thus there is no need to use a separate tool. Accordingly, even when tools cannot be obtained outdoors, the inflator may be easily reused.

The above-described embodiments of the present invention should not be interpreted as limiting to the scope of the invention. It is obvious to those skilled in the art that various changes and modifications may be made without departing from the spirit and scope of the invention.

INDUSTRIAL APPLICABILITY

According to the present invention, an inflator is directly installed at protective equipment, generates no heat and noise due to no use of gunpowder, and does not require a structure for relieving heat and noise. Thus, the inflator may have a simple structure and a decreased weight and be cost-saving, thus being industrially applicable.

What is claimed is:

1. An inflator mounted on protective equipment, the inflator comprising:
   a main body (100) having a cylindrical structure with upper and lower openings, provided with a key ball insertion hole (110) and a gas supply hole (120) in lateral portions thereof, and provided, at a lower side thereof, with a bomb (600) coupled thereto to store a compressed air;
   an eccentric lever (200) rotatably coupled to the upper opening of the main body (100) by a rotary shaft (230) and comprising a lever (210) to adjust downward pressure by rotating an eccentric drum part (220) having a circular plate shape;
   a perforating part (300) to provide a restoring force downward according to a pressure state of the eccentric lever (200) and to perforate the bomb (600) so as to supply a gas of the bomb (600) to protective equipment of a user via the gas supply hole (120); and
   a key ball (400) to restrict movement of the perforating part (300) while being inserted into the key ball insertion hole (110) and escape therefrom according to an external state to operate the perforating part (300).

2. The inflator according to claim 1, wherein the main body (100) is provided, at an upper portion thereof, with a cutaway portion (130) to allow rotation of the lever (210).

3. The inflator according to claim 1, wherein the perforating part (300) comprises:
   a spring (320) having a restoring force;
   a pressing member (310) positioned at an upper side of the spring (320) to receive a change in pressure according to rotation of the eccentric lever (200);
   a perforating body part (330) coupled to a lower side of the spring (320) to move downward by the restoring force of the spring (320) when the key ball (400) escapes; and
   a perforating pin (340) disposed below the perforating body part (330) to perforate the bomb (600).

4. The inflator according to claim 3, wherein the perforating body part (330) is provided with a connection hole (331) through which a gas in the perforated bomb (600) is supplied to the gas supply hole (120) of the main body (100) via the perforating pin (340) having a hollow structure.

\* \* \* \* \*